(12) United States Patent
Wygant

(10) Patent No.: US 10,570,783 B2
(45) Date of Patent: Feb. 25, 2020

(54) POWER GENERATION SYSTEM USING SUPERCRITICAL CARBON DIOXIDE

(71) Applicant: Hanwha Power Systems Co., Ltd., Changwon-si (KR)

(72) Inventor: Karl Wygant, Changwon-si (KR)

(73) Assignee: HANWHA POWER SYSTEMS CO., LTD, Changwon-si (KR)

( * ) Notice: Subject to any disclaimer, the term of this patent is extended or adjusted under 35 U.S.C. 154(b) by 122 days.

(21) Appl. No.: 15/823,809

(22) Filed: Nov. 28, 2017

(65) Prior Publication Data
US 2019/0162083 A1 May 30, 2019

(51) Int. Cl.
| F01K 19/04 | (2006.01) |
| F01K 25/10 | (2006.01) |
| H02K 7/18 | (2006.01) |
| F01K 15/00 | (2006.01) |
| F16H 1/22 | (2006.01) |

(52) U.S. Cl.
CPC ............ *F01K 19/04* (2013.01); *F01K 25/103* (2013.01); *H02K 7/1823* (2013.01); *F01K 15/00* (2013.01); *F16H 1/22* (2013.01)

(58) Field of Classification Search
CPC .......... F25J 3/0625; F25J 3/0655; C01B 3/12; C01B 3/506; C01B 3/52; C10J 3/00; C10L 3/10; C10L 3/102
See application file for complete search history.

(56) References Cited

U.S. PATENT DOCUMENTS

| 5,611,663 A | 3/1997 | Kotzur |
| 8,745,991 B2 | 6/2014 | Kim et al. |
| 10,240,530 B2 * | 3/2019 | Deleau ................ F02C 1/005 |
| 2001/0004830 A1 * | 6/2001 | Wakana ............... F02C 6/14 60/39.182 |
| 2003/0005698 A1 * | 1/2003 | Keller .................. F01K 23/10 60/643 |

(Continued)

FOREIGN PATENT DOCUMENTS

| JP | 8-189494 A | 7/1996 |
| JP | 2012-145092 A | 8/2012 |

(Continued)

OTHER PUBLICATIONS

English Translation JP 2012145092 A (Year: 2012).*

(Continued)

*Primary Examiner* — Mark A Laurenzi
*Assistant Examiner* — Shafiq Mian
(74) *Attorney, Agent, or Firm* — Sughrue Mion, PLLC

(57) ABSTRACT

There is provided a supercritical carbon dioxide ($CO_2$) power generation system including a first compression part and a second compression part to independently compress the working fluid; a first regeneration part to heat the working fluid compressed by the first compression part; a second regeneration part to heat the working fluid heated by the first regeneration part and the working fluid compressed by the second compression part; a main heat exchange part to transfer heat generated from a heat source to the working fluid; an expansion part to generate power by expanding the working fluid; a power transmission part to transmit the power; and a power generation part to generate electric power using the power.

17 Claims, 1 Drawing Sheet

(56) References Cited

U.S. PATENT DOCUMENTS

| | | | |
|---|---|---|---|
| 2005/0178114 A1* | 8/2005 | Althaus | F02C 6/16 60/407 |
| 2006/0165533 A1* | 7/2006 | Jurmann | C21D 1/613 417/65 |
| 2008/0008602 A1* | 1/2008 | Pozivil | F04D 29/5833 417/243 |
| 2011/0162396 A1* | 7/2011 | Chen | F25B 9/008 62/115 |
| 2011/0203313 A1* | 8/2011 | Huda | C01B 3/12 62/617 |
| 2013/0001948 A1* | 1/2013 | Lim | F02C 6/16 290/52 |
| 2013/0033044 A1* | 2/2013 | Wright | F02C 9/00 290/1 R |
| 2013/0139509 A1* | 6/2013 | Berti | F01K 25/103 60/648 |
| 2013/0145759 A1* | 6/2013 | Sonwane | F01K 25/103 60/526 |
| 2015/0139776 A1* | 5/2015 | Takeda | F04D 27/0246 415/1 |
| 2015/0230367 A1* | 8/2015 | Judge | H05K 7/20827 62/175 |
| 2015/0292349 A1 | 10/2015 | Mariotti et al. | |
| 2016/0230771 A1* | 8/2016 | Dobat | F01D 5/02 |
| 2016/0326916 A1 | 11/2016 | Roh et al. | |

FOREIGN PATENT DOCUMENTS

| | | | | |
|---|---|---|---|---|
| JP | 2012145092 A | * | 8/2012 | F01K 25/103 |
| JP | 2015-25423 A | | 2/2015 | |
| KR | 10-2011-0104328 A | | 9/2011 | |
| KR | 10-1204908 B1 | | 11/2012 | |
| KR | 10-2016-0120471 A | | 10/2016 | |
| KR | 10-2016-0130551 A | | 11/2016 | |
| KR | 10-1691908 B1 | | 1/2017 | |

OTHER PUBLICATIONS

International Search Report and Written Opinion (PCT/ISA/210 and PCT/ISA/237), dated Feb. 19, 2019 by International Searching Authority in International Application No. PCT/KR2018/013504.

* cited by examiner

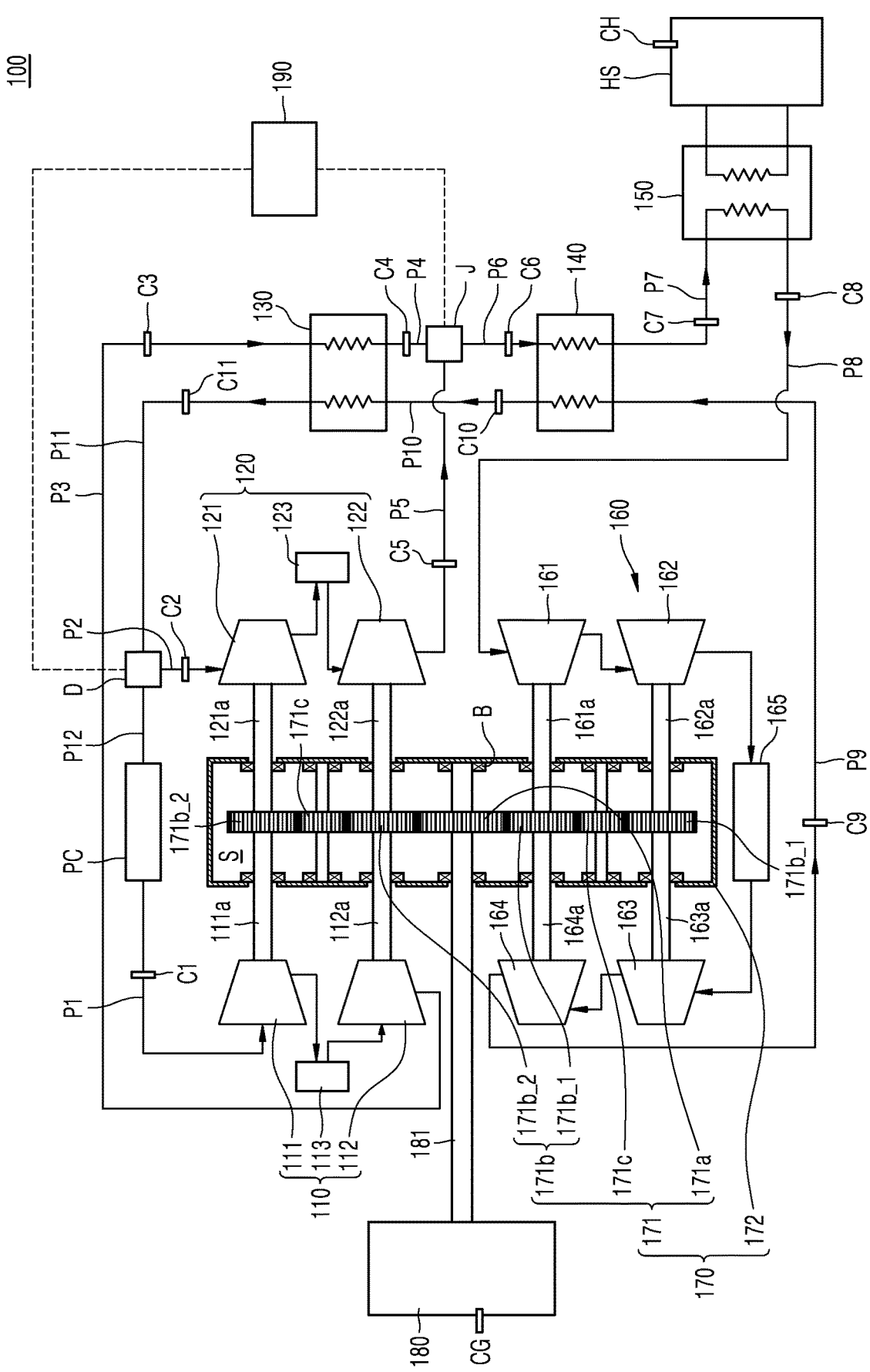

POWER GENERATION SYSTEM USING SUPERCRITICAL CARBON DIOXIDE

BACKGROUND

1. Field

One or more exemplary embodiments relate to a power generation system capable of generating power by using supercritical carbon dioxide ($CO_2$) as a working fluid.

2. Description of the Related Art

A supercritical carbon dioxide ($CO_2$) power generation system is a power generation system which drives a turbine by heating $CO_2$ that is compressed to an extra-high pressure equal to or greater than a critical pressure.

Such a supercritical $CO_2$ power generation system generally adopts a Brayton cycle type, which has been recently and actively researched for its high power generation efficiency and less limitation in heat sources.

Korean Laid-open Patent No. 2016-0130551 discloses a supercritical $CO_2$ power generation system using a parallel expansion type cascade cycle.

SUMMARY

One or more exemplary embodiments provide a supercritical CO2 power generation system having an improved structure.

Additional aspects will be set forth in part in the description which follows and, in part, will be apparent from the description, or may be learned by practice of the presented exemplary embodiments.

According to an aspect of the exemplary embodiment, there is provided a supercritical carbon dioxide (CO2) power generation system using supercritical CO2 as a working fluid, the supercritical CO2 power generation system including: a first compression part and a second compression part configured to independently compress the working fluid; a first regeneration part configured to heat the working fluid compressed by the first compression part; a second regeneration part configured to heat the working fluid heated by the first regeneration part and the working fluid compressed by the second compression part; a main heat exchange part configured to transfer heat generated from a heat source to the working fluid heated by the second regeneration part; an expansion part configured to generate power by expanding the working fluid that has received heat from the main heat exchange part; a power transmission part configured to transmit the power generated by the expansion part to the first compression part and the second compression part; and a power generation part configured to generate electric power using the power transmitted from the power transmission part.

The working fluid from the expansion part exchanges heat, in the second regeneration part, with the working fluid heated by the first regeneration part and the working fluid compressed by the second compression part, and subsequently exchanges heat, in the first regeneration part, with the working fluid from the first compression part.

The power transmission part may include at least one gear train and a gear box accommodating the gear train.

The gear train is configured to receive the power through a rotary shaft connected to the expansion part and transmit the received power to a driving shaft connected to the first compression part, a driving shaft connected to the second compression part, and a driving shaft of the power generation part.

The supercritical CO2 power generation system may further include a pre-cooler configured to cool down the working fluid moving to the first compression part.

The first compression part may include at least two first compressors.

The supercritical CO2 power generation system may further include a first inter-cooler arranged between the first compressors.

The second compression part may include at least two second compressors.

The supercritical CO2 power generation system may further include a second inter-cooler arranged between the second compressors.

The supercritical CO2 power generation system may further include a branching part arranged on a conduit between the second compression part and the first regeneration part.

The supercritical CO2 power generation system may further include a control part configured to control the branching part.

The first compression part and the second compression part face each other with the gear box interposed therebetween.

The supercritical CO2 power generation system may further include a join part arranged on a conduit between the first regeneration part and the second regeneration part such that the working fluid compressed by the second compression part and the working fluid heated by the first regeneration part join each other at the join part.

The supercritical CO2 power generation system may further include a control part configured to control the join part.

The expansion part may include at least two expanders.

The supercritical CO2 power generation system may further include at least one reheater arranged between the expanders.

The gear train may include: an output pinion gear configured to transmit the power generated by the expansion part, a bull gear configured to transmit the power transmitted by the output pinion gear; and a driving pinion gear configured to receive the power transmitted by the bull gear, wherein a rotary shaft of the expansion part is connected to the output pinion gear, and wherein a driving shaft of the first compression part and a driving shaft of the second compression part are connected to the driving pinion gear, and a driving shaft of the power generation part is connected to the bull gear.

The gear train is arranged in a single space within the gear box.

BRIEF DESCRIPTION OF THE DRAWINGS

These and/or other aspects will become apparent and more readily appreciated from the following description of the exemplary embodiments, taken in conjunction with the accompanying drawings in which:

FIG. 1 is a schematic block diagram of a supercritical $CO_2$ power generation system according to an exemplary embodiment.

DETAILED DESCRIPTION OF EXEMPLARY EMBODIMENTS

Hereinafter, one or more exemplary embodiments will be described in detail with reference to accompanying drawings. Also, in the present specification and drawings, same reference numerals denote substantially the same components and detailed descriptions thereof are not repeated. As used herein, the term "and/or" includes any and all combinations of one or more of the associated listed items. Expressions such as "at least one of," when preceding a list of elements, modify the entire list of elements and do not modify the individual elements of the list.

Hereinafter, a supercritical carbon dioxide ($CO_2$) power generation system denotes a system using supercritical $CO_2$ as a working fluid, and includes a system in which most of the working fluid is supercritical and remaining working fluid is subcritical, as well as a system in which all of working fluid flowing in a cycle is supercritical.

In addition, the working fluid according to the exemplary embodiments will be referred to as $CO_2$, but the term $CO_2$ is used to broadly include pure $CO_2$, $CO_2$ including a small amount of impurity, a fluid in which $CO_2$ is mixed with one or more additives, etc.

FIG. 1 is a schematic block diagram of a supercritical $CO_2$ power generation system 100 according to an exemplary embodiment.

Referring to FIG. 1, the supercritical $CO_2$ power generation system 100 may include a first compression part 110, a second compression part 120, a first regeneration part 130, a second regeneration part 140, a main heat exchange part 150, an expansion part 160, a power transmission part 170, a power generation part 180, and a control part 190.

The first compression part 110 may include two first compressors 111 and 112, a first inter-cooler 113 disposed between the first compressors 111 and 112. The first compression part 110 may be driven by the power (i.e., motive power) transmitted from the power transmission part 170.

The first compressors 111 and 112 may receive a working fluid from a first conduit P1 to compress the working fluid. The first compressors 111 and 112 may respectively include centrifugal compressors.

Here, the first conduit P1 may be connected to a precooler PC, and the pre-cooler PC may cool down some of the working fluid discharged from a branching part D.

The branching part D may be arranged on a conduit between the second compression part 120 and the first regeneration part 130, and may include an electronic valve that may be electronically controlled or a mechanical valve that may be manually controlled. Therefore, the control part 190 may automatically control the branching part D, or a user may manually control the branching part D. Since the branching part D is connected to an eleventh conduit P11, a twelfth conduit P12, and a second conduit P2, a flow rate of whole working fluid flowing through the eleventh conduit P11 may be controlled using the branching part D. Likewise, a flow rate of the working fluid flowing through the second conduit P2 and the twelfth conduit P12 may be also controlled using the branching part D.

According to the exemplary embodiment of FIG. 1, the pre-cooler PC is connected to the first conduit P1. However, the arrangement of the pre-cooler PC is not limited thereto. That is, according to another exemplary embodiment, the pre-cooler PC may not be connected to the first conduit P1.

The first inter-cooler 113 may be arranged between the first compressors 111 and 112. The first inter-cooler 113 may cool down the working fluid from the first compressor 111, thereby reducing a required power of the first compression part 110.

According to the exemplary embodiment of FIG. 1, the first compression part 110 includes two first compressors 111 and 112, but the number of the compressor is not limited thereto. That is, the first compression part may include at least one compressor, and the number of compressors is not particularly restricted. For example, the first compression part may include one, three, four, five, or more compressors.

According to the exemplary embodiment of FIG. 1, the first compression part 110 includes the first inter-cooler 113, but is not limited thereto. In another exemplary embodiment, the first compression part may not include the inter-cooler.

In addition, the second compression part 120 may include two second compressors 121 and 122, and a second inter-cooler 123 may be arranged between the second compressors 121 and 122. The second compression part 120 may be driven by the power transmitted from the power transmission part 170. The first compression part 110 and the second compression part 120 may be arranged to face each other, and a gear box 172 of the power transmission part 170 may be interposed therebetween.

The second compressors 121 and 122 may receive the working fluid from the second conduit P2 to compress the working fluid. The second compressors 121 and 122 may respectively include centrifugal compressors.

The second inter-cooler 123 is arranged between the second compressors 121 and 122. The first inter-cooler 123 may cool down the working fluid from the second compressor 121, thereby reducing a required power of the second compression part 120.

According to the exemplary embodiment of FIG. 1, the second compression part 120 includes two second compressors 121 and 122, but the number of the compressor is not limited thereto. That is, the second compression part 120 may include at least one compressor, and the number of compressors is not particularly restricted. For example, the second compression part 120 may include one, three, four, five, or more compressors.

According to the exemplary embodiment of FIG. 1, the second compression part 120 includes the second inter-cooler 123. However, the second compression part 120 according to exemplary embodiment may not include an inter-cooler.

In addition, the first regeneration part 130 may receive and heat the working fluid which is compressed by the first compression part 110 and transferred through a third conduit P3. That is, the working fluid compressed by the first compression part 110 exchanges heat with the working fluid from the second regeneration part 140 while passing through the first regeneration part 130. To do so, the first regeneration part 130 may have a structure of a general heat exchanger.

The working fluid heated by the first regeneration part 130 moves through a fourth conduit P4, and the working fluid compressed by the second compression part 120 moves through a fifth conduit P5. Then, these working fluids join at a join part J and move to the second regeneration part 140 through a sixth conduit P6.

The join part J is located on a conduit between the first regeneration part 130 and the second regeneration part 140. The join part J may include an electronic valve that may be electronically controlled, or a mechanical valve that may be manually controlled. Therefore, the control part 190 may automatically control the join part J, or a user may manually control the join part J.

Since the join part J is connected to three conduits, i.e., the fourth conduit P4, the fifth conduit P5, and the sixth conduit P6, a flow rate of overall working fluid flowing through the sixth conduit P6, a flow rate of the working fluid flowing through the fourth conduit P4, and a flow rate of the working fluid flowing through the fifth conduit P5 may be controlled by controlling the joint part J.

According to the exemplary embodiment of FIG. 1, the joint part J is separated from the second regeneration part 140, but is not limited thereto. That is, according to another exemplary embodiment, the working fluid from the fifth conduit P5 may directly flow to the second regeneration part 140. In this case, the join part J may be arranged inside the second regeneration part 140, and thus the working fluid from the fourth conduit P4 and the working fluid from the fifth conduit P5 may join at the join part J arranged within the second regeneration part 140.

In addition, the second regeneration part 140 may heat the working fluid heated by the first regeneration part 130 and the working fluid compressed by the second compression part 120. That is, the working fluid discharged out of the join part J may move to the second regeneration part 140 through the sixth conduit P6 and exchange heat with the working fluid from the expansion part 160 while passing through the second regeneration part 140. To do so, the second regeneration part 140 may have a structure of a general heat exchanger.

The working fluid heated by the second regeneration part 140 moves through a seventh conduit P7 to the main heat exchange part 150.

The main heat exchange part 150 transfers heat generated by a heat source HS to the working fluid heated by the second regeneration part 140. To do so, the main heat exchange part 150 may have a structure of a general heat exchanger.

The heat source HS may include any type of device that may generate heat. For example, the heat source HS may include one or more of various types of heat sources such as a solar heat system, a nuclear heat system, a geothermal heat system, a thermal heat system, etc.

The working fluid that has received the heat generated by the heat source HS may move to the expansion part 160 via an eighth conduit P8.

The expansion part 160 may generate power (i.e., motive power) by expanding the working fluid that has received the heat transferred from the main heat exchange part 150. The expansion part 160 may include first to fourth expanders 161, 162, 163, and 164, and a reheater 165.

The first to fourth expanders 161, 162, 163, and 164 may each have a turbine structure, and the reheater 165 may be arranged between the second expander 162 and the third expander 163. The reheater 165 may be driven by the heat transferred from the heat source HS, or may be driven by an additional driving source.

The expansion part 160 according to the exemplary embodiment of FIG. 1 includes four expanders, that is, first to fourth expanders 161, 162, 163, and 164, but is not limited thereto. That is, the number of expanders of the expansion part 160 is not particularly restricted. For example, the expansion part 160 may include one, two, three, five, six, or more expanders.

According to the exemplary embodiment of FIG. 1, the expansion part 160 includes a single reheater 165, but is not limited thereto. That is, the expansion part 160 may include a plurality of reheaters. Further, the arrangement of the reheater(s) may vary according to exemplary embodiments. For example, a reheater may be arranged between the first and second expanders 161 and 162, and/or between the third expander 163 and the fourth expander 164. Moreover, the expansion part 160 may not include a reheater.

In addition, the power transmission part 170 may transmit the power generated by the expansion part 160 to the first and second compression parts 110 and 120, and transmit remaining power to the power generation part 180 to perform electric power generation.

The power transmission part 170 may include at least one gear train 171, and a gear box 172 accommodating the gear train 171. The gear train 171 may receive power from rotary shafts 161a, 162a, 163a, and 164a of the expansion part 160, and transmit the power to driving shafts 111a and 112a of the first compression part 110, driving shafts 121a and 122a of the second compression part 120, and a driving shaft 181 of the power generation part 180.

The gear train 171 of the power transmission part 170 may have various shapes. That is, a designer may design gear trains to have various performances and structures. As an example, the gear train 171 according to the exemplary embodiment of FIG. 1 may include a bull gear 171a, a plurality of pinion gears 171b, and a plurality of connection gears 171c. The pinion gears 171b may include an output pinion gear 171b_1 and a driving pinion gear 171b_2. There is no particular limitation in shapes of the gears configuring the gear train 171. For example, the gears may have a spur gear shape, a helical gear shape, a double helical gear shape, etc.

The rotary shafts 161a, 162a, 163a, and 164a of the first to fourth expanders 161, 162, 163, and 164 are connected to the output pinion gear 171b_1, and the driving shafts 111a and 112a of the first compressors 111 and 112 and the driving shafts 121a and 122a of the second compressors 121 and 122 are connected to the driving pinion gear 171b_2. In addition, the connection gear 171c engages with the pinion gears 171b to transmit power.

The gear box 172 may include a metal material, but is not limited thereto. That is, there is no particular limitation in materials for forming the gear box, and various materials may be used.

The gear train 171 of the exemplary embodiment is concentrated in a single space S in the gear box 172, and installed via a plurality of bearings B.

Since the gear train 171 is concentrated in the single space S within the gear box 172 according to the exemplary embodiment, supplying and circulating of oil for lubricating the gear train 171 may be performed easily, and the gear train 171 may be effectively arranged. Thus, a volume of the overall power transmission part 170 may be decreased. As a result, the overall structure of the supercritical $CO_2$ power generation system 100 may be simplified so that installation operations are performed easily, an installation space may be effectively utilized, and accordingly, a size of the installation space of the supercritical $CO_2$ power generation system 100 may be reduced.

According to the exemplary embodiment of FIG. 1, the gear train 171 is arranged in the single space S within the gear box 172, but is not limited thereto. That is, according to another exemplary embodiment, a space within the gear box 172 may be partitioned into a plurality of spaces, and parts of the gear train 171 may be distributed respectively to the partitioned spaces.

The power generation part 180 may receive power from the power transmission part 170 to perform electric power generation. The power generation part 180 may have a general electric power generator structure. A driving shaft 181 of the power generation part 180 may be connected to the gear train 171 of the power transmission part 170 to receive the power.

The control part 190 may control the supercritical $CO_2$ power generation system 100. Specifically, the control part 190 may be connected to various sensors of the supercritical $CO_2$ power generation system 100 to receive sensor data and perform calculation, and control operations of the components in the supercritical $CO_2$ power generation system 100 according to an algorithm set by the user. To do so, the control part 190 may include hardware such as an electronic circuit board, an integrated circuit chip, etc., software, firmware, etc., and may be operated according to a control of the user or a control algorithm.

The supercritical $CO_2$ power generation system 100 may include one or more of various sensors, for example, first to eleventh sensors C1 to C11 for measuring the state of the working fluid, e.g., a pressure, a temperature, a flow rate, a specific volume, etc. The sensors C1 to C11 may be respectively arranged in the first to eleventh conduits P1 to P11. A heat source sensor CH for monitoring state of the heat source HS may be arranged in the heat source HS. A power generation part sensor CG for monitoring state of the power generation part 180 may be arranged in the power generation part 180.

Hereinafter, an example of a controlling operation of the control part 190 will be described below. For example, the control part 190 may appropriately control at least one of the branching part D and the join part J according to the state of the supercritical $CO_2$ power generation system 100. That is, the control part 190 may monitor the state of the heat source HS by using the heat source sensor CH provided in the heat source HS. The control part 190 may monitor a state of the power generation part 180 by using the power generation part sensor CG. The control part 190 may monitor the state of the working fluid in each conduit, e.g., temperature, pressure, flow rate, etc., by using the sensors C1 to C11. Then, the control part 190 may control the branching part D, the join part J, etc. for implementing an optimal operating efficiency as programmed in advance. For example, by controlling the branching part D, the flow rate of the working fluid moving to the first compression part 110 and the second compression part 120 may be appropriately adjusted. Also, by controlling the join part J, a flow rate of the working fluid from the second compression part 120, a flow rate of the working fluid from the first regeneration part 130, and a flow rate of the working fluid entering the second regeneration part 140 may be appropriately adjusted. Then, the optimal efficiency of the supercritical $CO_2$ power generation system 100 may be achieved. Moreover, generation of surge in the first compression part 110 and the second compression part 120 in some cases may be prevented.

Hereinafter, operations of the supercritical $CO_2$ power generation system 100 according to an exemplary embodiment will be described below with reference to FIG. 1.

Since supercritical $CO_2$ circulates in a closed cycle in the supercritical $CO_2$ power generation system 100 according to the exemplary embodiment, circulation processes of the working fluid will be described below.

First, the working fluid from the first regeneration part 130 moves to the branching part D along with the eleventh conduit P11. Some of the working fluid from the branching part D moves to the first compression part 110, and in this case, the working fluid enters the pre-cooler PC via the twelfth conduit P12 to be cooled down. Remaining working fluid from the branching part D moves to the second compressor 121 via the second conduit P2. Here, the control part 190 may control the branching part D so that the supercritical $CO_2$ power generation system 100 may achieve optimal performance.

The working fluid that is cooled down in the pre-cooler PC moves to the first compressor 111, and the first compressor 111 compresses the working fluid. The working fluid compressed by the first compressor 111 moves to the first inter-cooler 113 to be cooled down, and then enters the first compressor 112 to be compressed.

The working fluid compressed by the first compressor 112 moves to the first regeneration part 130 via the third conduit P3. The working fluid that moved to the first regeneration part 130 via the third conduit P3 exchanges heat with the working fluid that moved through the tenth conduit P10, and then is heated.

The working fluid that is heated through the heat exchange in the first regeneration part 130 moves to the join part J via the fourth conduit P4.

On the other hand, the working fluid that moved to the second compressor 121 from the branching part D is compressed by the second compressor 121. The working fluid compressed by the second compressor 121 moves to the second inter-cooler 123 to be cooled down, and then enters the second compressor 122 to be compressed.

The working fluid compressed by the second compressor 122 moves to the join part J via the fifth conduit P5.

As described above, the working fluid that moved through the fourth conduit P4 and the working fluid that moved through the fifth conduit P5 join each other in the join part J. The control part 190 may control the join part J so that the supercritical $CO_2$ power generation system 100 may achieve the optimal performance.

In addition, the working fluid moves from the join part J to the second regeneration part 140 through the sixth conduit P6. The working fluid that moved to the second regeneration part 140 through the sixth conduit P6 exchanges heat with the working fluid that moved through the ninth conduit P9, and therefore get heated. That is, the working fluid heated in the first regeneration part 130 and the working fluid compressed by the second compression part 120 join each other in the join part J, and after that, are heated in the second regeneration part 140.

The working fluid heated in the second regeneration part 140 moves through a seventh conduit P7 to the main heat exchange part 150. The main heat exchange part 150 transfers heat generated by the heat source HS to the working fluid from the second regeneration part 140.

The working fluid that has received the heat generated by the heat source HS moves to the expansion part 160 via the eighth conduit P8, and the expansion part 160 generates power while expanding the working fluid that has received the heat in the main heat exchange part 150.

That is, the working fluid moves to the first expander 161 via the eighth conduit P8 and expands to generate power. Next, the working fluid moves to the second expander 162 and expands to generate power. Then, the working fluid is heated again by the reheater 165. In addition, the working fluid heated by the reheater 165 moves to the third expander 163 and expands to generate power. Then, the working fluid moves to the fourth expander 164 and expands to generate power.

Next, the working fluid from the expansion part 160 sequentially exchanges heat in the second regeneration part 140 and the first regeneration part 130.

That is, the working fluid moves from the fourth expander 164 to the second regeneration part 140 via the ninth conduit P9, and exchanges the heat with the working fluid that moved to the second regeneration part 140 via the sixth conduit P6. In addition, the working fluid moves from the second regeneration part 140 to the first regeneration part 130 via the tenth conduit P10, and exchanges the heat with the working fluid that moved to the first regeneration part 130 via the third conduit P3.

Operations of the components in the supercritical $CO_2$ power generation system 100 according to circulation of the working fluid have been described as above. Hereinafter, driving of the power transmission part 170 and the power generation part 180 will be described in detail below.

As described above, the first to fourth expanders 161, 162, 163, and 164 of the expansion part 160 generate power while expanding the working fluid. At this time, the rotary shafts 161a, 162a, 163a, and 164a of the first to fourth expanders 161 to 164 transmit the power to the output pinion gear 171b_1 of the power transmission part 170, and the output pinion gear 171b_1 transmits the power to the bull gear 171a.

The bull gear 171a transmits the power to the driving pinion gear 171b_2. The driving pinion gear 171b_2 transmits the power to the driving shafts 111a and 112a of the first compressors 111 and 112, and to the driving shafts 121a and 122a of the second compressors 121 and 122 so as to drive the first compression part 110 and the second compression part 120.

In addition, since the bull gear 171a is connected to the driving shaft 181 of the power generation part 180, and the power is transmitted to the power generation part 180 as the bull gear 171a rotates to perform power generation.

As described above, according to the supercritical $CO_2$ power generation system 100 of an exemplary embodiment, the control part 190 may appropriately control at least one of the branching part D and the join part J according to the state of the supercritical $CO_2$ power generation system 100, thereby achieving optimal performance of the supercritical $CO_2$ power generation system 100. Moreover, generation of surge in the first compression part 110 and the second compression part 120 in some cases may be prevented.

In addition, according to the supercritical $CO_2$ power generation system 100 of an exemplary embodiment, the gear train 171 of the power transmission part 170 may be concentrated in the single space S within the gear box 172. As such, supplying and circulating of oil for lubricating the gear train 171 may be easily performed. Also, the gear train 171 may be effectively arranged. Also, the overall volume of the power transmission part 170 may be reduced. Therefore, the overall structure of the supercritical $CO_2$ power generation system 100 is simplified so that installation operations are performed easily, and an installation space may be effectively utilized, and accordingly, a size of the installation space of the supercritical $CO_2$ power generation system 100 may be reduced.

The supercritical $CO_2$ power generation system 100 according to an exemplary embodiment may be used in an industrial field of manufacturing or operating a power generation system using the supercritical $CO_2$ as the working fluid.

According to the exemplary embodiments, the supercritical $CO_2$ power generation system having an improved structure may be provided.

It should be understood that the exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the FIGURES, it will be understood by those of ordinary skill in the art that various changes in form and details may be made therein without departing from the spirit and scope of the inventive concept as defined by the following claims.

What is claimed is:

1. A supercritical carbon dioxide ($CO_2$) power generation system using supercritical $CO_2$ as a working fluid, the supercritical $CO_2$ power generation system comprising:
   a first compression part and a second compression part configured to independently compress the working fluid;
   a first regeneration part configured to heat the working fluid compressed by the first compression part;
   a second regeneration part configured to heat the working fluid heated by the first regeneration part and the working fluid compressed by the second compression part;
   a main heat exchange part configured to transfer heat generated from a heat source to the working fluid heated by the second regeneration part;
   an expansion part configured to generate power by expanding the working fluid that has received heat from the main heat exchange part;
   a power transmission part configured to transmit the power generated by the expansion part to the first compression part and the second compression part;
   a power generation part configured to generate electric power using the power transmitted from the power transmission part; and
   a branching valve arranged on a conduit between the second compression part and the first regeneration part, and configured to adjust a flow rate of the working fluid flowing from the first regeneration part to the first compression part and the second compression part.

2. The supercritical $CO_2$ power generation system of claim 1, wherein the working fluid from the expansion part exchanges heat, in the second regeneration part, with the working fluid heated by the first regeneration part and the working fluid compressed by the second compression part, and subsequently exchanges heat, in the first regeneration part, with the working fluid from the first compression part.

3. The supercritical $CO_2$ power generation system of claim 1, wherein the power transmission part comprises at least one gear train and a gear box accommodating the gear train.

4. The supercritical $CO_2$ power generation system of claim 3, wherein the gear train is configured to receive the power through a rotary shaft connected to the expansion part and transmit the received power to a driving shaft connected to the first compression part, a driving shaft connected to the second compression part, and a driving shaft of the power generation part.

5. The supercritical $CO_2$ power generation system of claim 1, further comprising a pre-cooler configured to cool down the working fluid moving to the first compression part.

6. The supercritical $CO_2$ power generation system of claim 1, wherein the first compression part comprises at least two first compressors.

7. The supercritical $CO_2$ power generation system of claim 6, further comprising a first inter-cooler arranged between the at least two first compressors.

8. The supercritical $CO_2$ power generation system of claim 1, wherein the second compression part comprises at least two second compressors.

9. The supercritical $CO_2$ power generation system of claim 8, further comprising a second inter-cooler arranged between the at least two second compressors.

10. The supercritical $CO_2$ power generation system of claim 1, further comprising a controller configured to control the branching valve.

11. The supercritical $CO_2$ power generation system of claim 1, wherein the first compression part and the second compression part face each other with a gear box interposed therebetween.

12. The supercritical $CO_2$ power generation system of claim 1, further comprising a join valve arranged on a conduit between the first regeneration part and the second regeneration part such that the working fluid compressed by the second compression part and the working fluid heated by the first regeneration part join each other at the join valve.

13. The supercritical $CO_2$ power generation system of claim 12, further comprising a controller configured to control the join valve.

14. The supercritical $CO_2$ power generation system of claim 1, wherein the expansion part comprises at least two expanders.

15. The supercritical $CO_2$ power generation system of claim 14, further comprising at least one reheater arranged between the expanders.

16. The supercritical $CO_2$ power generation system of claim 3, wherein the gear train comprises:
   an output pinion gear configured to transmit the power generated by the expansion part,
   a bull gear configured to transmit the power transmitted by the output pinion gear; and
   a driving pinion gear configured to receive the power transmitted by the bull gear,
   wherein a rotary shaft of the expansion part is connected to the output pinion gear, and
   wherein a driving shaft of the first compression part and a driving shaft of the second compression part are connected to the driving pinion gear, and a driving shaft of the power generation part is connected to the bull gear.

17. The supercritical $CO_2$ power generation system of claim 3, wherein the gear train is arranged in a single space within the gear box.

* * * * *